US012559438B2

(12) United States Patent　　　　(10) Patent No.: US 12,559,438 B2
Gittins et al.　　　　　　　　　　　(45) Date of Patent: Feb. 24, 2026

(54) SILICA FERTILIZER AND USES THEREOF

(71) Applicant: IMERTECH SAS, Paris (FR)

(72) Inventors: David Gittins, San Jose, CA (US);
Christina Vogiatzi, Zografou Athens
(GR); Kalena Stovall, Atlanta, GA
(US); Jacob Misuraca, Paris (FR)

(73) Assignee: IMERTECH SAS, Paris (FR)

( * ) Notice: Subject to any disclaimer, the term of this
patent is extended or adjusted under 35
U.S.C. 154(b) by 1060 days.

(21) Appl. No.: 17/607,705

(22) PCT Filed: Apr. 24, 2020

(86) PCT No.: PCT/EP2020/061442
§ 371 (c)(1),
(2) Date: Oct. 29, 2021

(87) PCT Pub. No.: WO2020/221665
PCT Pub. Date: Nov. 5, 2020

(65) Prior Publication Data
US 2022/0213001 A1　　Jul. 7, 2022

(30) Foreign Application Priority Data
Apr. 30, 2019　(EP) ..................................... 19386027

(51) Int. Cl.
　*C05D 9/00*　　　(2006.01)
　*C05G 3/70*　　　(2020.01)
　*C05G 5/27*　　　(2020.01)
(52) U.S. Cl.
　CPC ................. *C05D 9/00* (2013.01); *C05G 3/70*
　　　(2020.02); *C05G 5/27* (2020.02)
(58) Field of Classification Search
　CPC ............... C05D 9/00; C05G 3/70; C05G 5/27
　See application file for complete search history.

(56) References Cited

U.S. PATENT DOCUMENTS

| | | | |
|---|---|---|---|
| 2003/0213275 A1 | 11/2003 | Walls | |
| 2016/0207844 A1* | 7/2016 | Stoller | ..................... C05D 5/00 |
| 2019/0133133 A1 | 5/2019 | Rabot et al. | |

FOREIGN PATENT DOCUMENTS

| | | | | |
|---|---|---|---|---|
| CN | 106045678 A | * | 10/2016 | ............... C05D 9/00 |
| CN | 107245011 A | * | 10/2017 | ............... C05G 3/00 |
| CN | 108882714 | | 11/2018 | |
| EP | 2840074 A1 | * | 2/2015 | ............... C05D 9/00 |
| WO | WO-2017-186860 A1 | | 11/2017 | |
| WO | WO-2018-169411 A1 | | 9/2018 | |
| WO | WO-2018-175821 A1 | | 9/2018 | |

OTHER PUBLICATIONS

Search Report for counterpart International Patent Application No.
202080031464.2, (2 pages) (translation—2 pages), dated Oct. 8,
2022.
Chen, Y., "New Fertilizer Use Manual", Zhejiang Science and
Technology Press, 1$^{st}$ Ed. (4 pages), published Aug. 30, 2008.
International Search Report for counterpart International Patent
Application No. 202080031464.2, dated Apr. 6, 2022 (2 pages)
(translation—2 pages).
International Search Report and Written Opinion mailed Jul. 10,
2020, in International Application No. PCT/EP2020/061442.

* cited by examiner

*Primary Examiner* — Wayne A Langel
(74) *Attorney, Agent, or Firm* — Finnegan, Henderson,
Farabow, Garrett & Dunner, LLP

(57) ABSTRACT

Aqueous suspensions comprising a mineral having a silica
content equal to or greater than about 40 wt % as a plant
fertilizer, wherein the aqueous suspension comprises equal
to or less than about 10% (w/v) of the mineral, methods of
making said aqueous suspensions, and uses of said aqueous
suspensions as a plant fertilizer.

11 Claims, No Drawings

SILICA FERTILIZER AND USES THEREOF

CLAIM FOR PRIORITY

This application is a U.S. national phase entry under 35 U.S.C. § 371 from PCT International Application No. PCT/EP2020/061442, filed Apr. 24, 2020, which claims the benefit of priority of European Patent Application No. 19386027.7, filed Apr. 30, 2019, from both of which this application claims priority and both of which are incorporated herein by reference.

TECHNICAL FIELD

The present invention relates generally to the use of an aqueous suspension comprising a mineral having a silica content equal to or greater than about 40 wt % as a fertilizer. The present invention further relates to a method of fertilizing a plant, wherein the method comprises making an aqueous suspension comprising a mineral having a silica content equal to or greater than about 40 wt % and applying it to a seed, plant or growing substrate (e.g. soil) surround a seed or plant. The present invention also relates to the mineral products used in the aqueous suspensions as described herein and concentrated slurries comprising the minerals, from which the aqueous suspensions for use as a fertilizer may be made.

BACKGROUND

Silicon can assist in promoting the growth and development of plants. Silicon-containing materials can therefore be included in various plant fertilizers in order to provide a source of silicon. For example, solubilised silicates may be used in liquid form. However, this is relatively expensive and specially converted equipment is required to handle liquid fertilizer. Alternatively, silica-containing materials can be used in solid (granular) form. However, these materials must have a relatively large granule size in order to be applied to plants effectively (e.g. without being blown away by the wind). Solid materials, by the term SC, are directly incorporated into the growing substrate (e.g. soil) to avoid drifting, which is labour intensive. The large granule size of these materials also reduces the rate at which silicon dissolves in water and therefore becomes available to the plant. Alternatively, particulate matter containing microscopic solids or liquid droplets that are small enough to be inhaled can cause serious health problems. Some particles less than about 10 microns in diameter can get deep into the lungs and even into the bloodstream. Particles of less than about 2.5 microns in diameter pose the greatest risk to health. It is therefore desirable to provide alternative and/or improved products and methods for providing a source of silicon to plants.

SUMMARY

In accordance with a first aspect of the present invention there is provided a use of an aqueous suspension comprising a mineral having a silica content equal to or greater than about 40 wt % as a plant fertilizer, wherein the aqueous suspension comprises equal to or less than about 10% (w/v) of the mineral. In certain embodiments, the aqueous suspension is made from a powder or a concentrated slurry of the mineral having a silica content equal to or greater than about 40 wt %.

In accordance with a second aspect of the present invention there is provided a method of fertilizing a plant, the method comprising:

making an aqueous suspension comprising a mineral having a silica content equal to or greater than about 40 wt % from a powder or a concentrated slurry of the mineral having a silica content equal to or greater than about 40 wt %, and applying the aqueous suspension to a seed, plant or growing substrate (e.g. soil) surrounding a seed or plant, wherein the aqueous suspension comprises equal to or less than about 10% (w/v) of the mineral.

In accordance with a third aspect of the present invention there is provided a fertilizer composition, wherein the fertilizer composition is an aqueous suspension comprising a mineral having a silica content equal to or greater than about 40 wt %, and wherein the aqueous suspension comprises equal to or less than about 10% (w/v) of the mineral.

In accordance with a fourth aspect of the present invention there is provided a concentrated slurry comprising a mineral having a silica content equal to or greater than about 40 wt %, wherein the concentrated slurry has a solids content equal to or greater than about 30 wt % and a viscosity ranging from about 60 cP to about 700 cP.

In accordance with a fifth aspect of the present invention there is provided a concentrated slurry comprising a mineral having a silica content equal to or greater than about 40 wt %, wherein the concentrated slurry has a solids content equal to or greater than about 20 wt % and a viscosity ranging from about 60 cP to about 2000 cP.

In accordance with a sixth aspect of the present invention there is provided a method of making a concentrated slurry of the fourth or fifth aspect of the present invention, the method comprising mixing a mineral having a silica content equal to or greater than about 40 wt % with water and optionally one or more dispersing agents, one or more thickeners, one or more wetting agents, or a combination thereof.

In accordance with a seventh aspect of the present invention there is provided a method of making an aqueous suspension comprising equal to or less than about 10% (w/v) of a mineral having a silica content equal to or greater than about 40 wt %, the method comprising diluting a concentrated slurry of the fourth or fifth aspect of the present invention.

Certain embodiments of any aspect of the present invention may provide one or more of the following advantages:

provision of plant-available silicon;

provision of plant-available silicon in liquid form;

reduced particle size of mineral, which may, for example, increase the rate at which silicon becomes available to plants;

increased yield;

increased protein content.

The details, examples and preferences provided in relation to any particular one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

The present invention is based on the surprising finding that silica-containing minerals can be used as a fertilizer in the form of an aqueous suspension. In particular, silica-containing mineral powder can be used as a fertilizer by applying the silica-containing mineral powder in the form of an aqueous suspension. The present invention is further based on the surprising finding that a silica-containing mineral can be used in the form of an aqueous suspension to increase the yield and/or protein content of a plant.

The present invention is additionally based on the surprising finding that it is possible to make a concentrated slurry of a mineral having a silica content equal to or greater than about 40 wt %. Advantageously, the concentrated slurry has a viscosity that enables it to be pourable. This enables the mineral having a silica content equal to or greater than about 40 wt % to be shipped to a customer (e.g. farmer) in a form suitable and convenient to make an aqueous suspension comprising equal to or less than about 10% (w/v) of the mineral for use as a fertilizer.

There is therefore provided herein a use of an aqueous suspension comprising a mineral having a silica content equal to or greater than about 40 wt % as a plant fertilizer, wherein the aqueous suspension comprises equal to or less than about 10% (w/v) of the mineral. In certain embodiments, the aqueous suspension is made from a powder or a concentrated slurry of the mineral having a silica content equal to or greater than about 40 wt %, for example by mixing the powder or the concentrated slurry with an aqueous solvent such as water.

There is further provided herein a method of fertilizing a plant, the method comprising:

making an aqueous suspension comprising a mineral having a silica content equal to or greater than about 40 wt % from a powder or a concentrated slurry of the mineral having a silica content equal to or greater than about 40 wt %, and applying the aqueous suspension to a seed, plant or growing substrate (e.g. soil) surrounding a seed or plant, wherein the aqueous suspension comprises equal to or less than about 10% (w/v) of the mineral.

The term "fertilizer" refers to any product that is beneficial for the growth and/or development of plants. The fertilizer may, for example, act as a source of one or more nutrients essential or useful for the growth and/or development of plants, for example as a source of silicon, nitrogen, phosphorous, and/or potassium.

The term "powder" refers to a solid particulate material. The aqueous suspensions described herein may be made from a powder of the mineral having a silica content equal to or greater than about 40 wt %.

The term "concentrated slurry" refers to a suspension that has a solids content equal to or greater than about 20 wt % or equal to or greater than about 30 wt %. For example, a concentrated slurry of wollastonite may have a solids content equal to or greater than about 50 wt % or equal to or greater than about 60 wt % or equal to or greater than about 70 wt %. For example, a concentrated slurry of diatomite may have a solids content equal to or greater than about 20 wt % or equal to or greater than about 30 wt % or equal to or greater than about 32 wt % or equal to or greater than about 34 wt %.

The aqueous suspensions described herein may be made from a concentrated slurry of the mineral having a silica content equal to or greater than about 40 wt %. The concentrated slurry may, for example, be an aqueous suspension. The aqueous solvent may, for example, be water. The concentrated slurry may comprise, consist essentially of, or consist of water and the mineral having a silica content equal to or greater than about 40 wt %. The concentrated slurry may, for example, comprise one or more further additives, for example one or more dispersing agents, one or more wetting agents, one or more thickening agents, or any combination thereof. The concentrated slurry may comprise, consist essentially of, or consist of water, the mineral having a silica content equal to or greater than about 40 wt %, and one or more of one or more dispersing agents, one or more thickening agents, one or more wetting agents, or a combination thereof.

The concentrated slurry may, for example, be a stable concentrated slurry, for example at least about 90% of the particles may remain in suspension for 30 days after making the concentrated slurry. This may be measured by change in viscosity over 30 days. For example, the viscosity of a stable slurry may change by less than about 100 cP or less than about 50 cP over 30 days.

The one or more further additives may each be present in the concentrated slurry in an amount ranging from about 0.01% (w/v) to about 5% (w/v). For example, the one or more further additives may each be present in the concentrated slurry in an amount ranging from about 0.05% (w/v) to about 4% (w/v) or from about 0.1% (w/v) to about 3% (w/v) or from about 0.5% (w/v) to about 2% (w/v) or from about 0.5% (w/v) to about 1.5% (w/v).

The total amount of further additives in the concentrated slurry may, for example, be equal to or less than about 10% (w/v). For example, the total amount of further additives in the concentrated slurry may be equal to or less than about 8% (w/v) or equal to or less than about 6% (w/v) or equal to or less than about 5% (w/v) or equal to or less than about 4% (w/v) or equal to or less than about 2% (w/v). For example, the total amount of further additives in the concentrated slurry may range from about 0.01% (w/v) to about 10% (w/v) or from about 0.1% (w/v) to about 5%.

The concentrated slurry may, for example, have a solids content equal to or greater than about 20 wt %. For example, the concentrated slurry may have a solids content equal to or greater than about 21 wt % or equal to or greater than about 22 wt % or equal to or greater than about 23 wt %. The concentrated slurry may, for example, have a solids content equal to or greater than about 32 wt %. For example, the concentrated slurry may have a solids content equal to or greater than about 34 wt % or equal to or greater than about 35 wt % or equal to or greater than about 38 wt % or equal to or greater than about 40 wt % or equal to or greater than about 45 wt % or equal to or greater than about 50 wt % or equal to or greater than about 55 wt % or equal to or greater than about 60 wt % or equal to or greater than about 65 wt % or equal to or greater than about 70 wt %. For example, the concentrated slurry may have a solids content equal to or less than about 90 wt % or equal to or less than about 85 wt % or equal to or less than about 80 wt % or equal to or less than about 75 wt %.

Where the concentrated slurry comprises wollastonite, the concentrated slurry may have a solids content equal to or greater than about 50 wt %, for example equal to or greater than about 55 wt % or equal to or greater than about 60 wt % or equal to or greater than about 65 wt % or equal to or greater than about 70 wt %. Where the concentrated slurry comprises wollastonite, the concentrated slurry may have a solids content equal to or less than about 85 wt %, for example equal to or less than about 80 wt % or equal to or less than about 75 wt % or equal to or less than about 73 wt %. For example, where the concentrated slurry comprises wollastonite, the concentrated slurry may have a solids content ranging from about 50 wt % to about 85 wt % or from about 60 wt % to about 80 wt % or from about 65 wt % to about 75 wt % or from about 65 wt % to about 73 wt %.

Where the concentrated slurry comprises diatomite, the concentrated slurry may have a solids content equal to or greater than about 20 wt %, for example equal to or greater than about 21 wt % or equal to or greater than about 22 wt % or equal to or greater than about 23 wt %. Where the concentrated slurry comprises diatomite, the concentrated slurry may have a solids content equal to or greater than about 30 wt %, for example equal to or greater than about 32 wt % or equal to or greater than about 34 wt % or equal to or greater than about 35 wt %. Where the concentrated slurry comprises diatomite, the concentrated slurry may have a solids content equal to or greater than about 40 wt %, for example equal to or greater than about 41 wt % or equal to or greater than about 42 wt % or equal to or greater than about 43 wt %. Where the concentrated slurry comprises diatomite, the concentrated slurry may have a solids content equal to or less than about 60 wt %, for example equal to or less than about 55 wt % or equal to or less than about 50 wt % or equal to or less than about 45 wt % or equal to or less than about 40 wt % or equal to or less than about 37 wt %. For example, where the concentrated slurry comprises diatomite, the concentrated slurry may have a solids content ranging from about 20 wt % to about 60 wt % or from about 20 wt % to about 50 wt %. For example, where the concentrated slurry comprises diatomite, the concentrated slurry may have a solids content ranging from about 30 wt % to about 60 wt % or from about 30 wt % to about 50 wt % or from about 30 wt % to about 40 wt % or from about 32 wt % to about 37 wt %.

The solid materials in the concentrated slurry may, for example, comprise equal to or greater than about 90 wt % of the mineral having a silica content equal to or greater than about 40 wt %. For example, the solids materials in the slurry may comprise equal to or greater than about 92 wt % or equal to or greater than about 94 wt % or equal to or greater than about 95 wt % or equal to or greater than about 96 wt % or equal to or greater than about 98 wt % of the mineral having a silica content equal to or greater than about 40 wt %. For example, the solids materials in the slurry may comprise from about 90 wt % to about 100 wt % or from about 92 wt % to about 99 wt % or from about 94 wt % to about 98 wt % of the mineral having a silica content equal to or greater than about 40 wt %.

When the concentrated slurry further comprises one or more dispersing agents, the solids content of the concentrated slurry may be higher than the solids content of the concentrated slurry without dispersing agents. For example, when the concentrated slurry further comprises one or more dispersing agents, the solids content of the concentrated slurry may be equal to or greater than about 30 wt % or equal to or greater than about 35 wt % or equal to or greater than about 40 wt % or equal to or greater than about 45 wt % or equal to or greater than about 50 wt % or equal to or greater than about 55 wt % or equal to or greater than about 60 wt % or equal to or greater than about 65 wt % or equal to or greater than about 70 wt %. For example, a concentrated slurry comprising one or more dispersing agents may have a solids content ranging from about 30 wt % to about 90 wt % or from about 40 wt % to about 90 wt % or from about 50 wt % to about 90 wt % or from about 60 wt % to about 90 wt % or from about 70 wt % to about 90 wt %.

The concentrated slurry may, for example, have a viscosity ranging from about 60 cP to about 2000 cP, for example from about 100 cP to about 1500 cP or from about 200 cP to about 1000 cP or from about 400 cP to about 800 cP.

The concentrated slurry may, for example, have a viscosity ranging from about 60 cP to about 700 cP, for example from about 100 cP to about 500 cP or from about 200 cP to about 400 cP.

Where the concentrated slurry comprises wollastonite, the concentrated slurry may have a viscosity equal to or less than about 500 cP, for example equal to or less than about 450 cP or equal to or less than about 400 cP or equal to or less than about 350 cP. For example, where the concentrated slurry comprises wollastonite, the concentrated slurry may have a viscosity equal to or greater than about 200 cP, for example equal to or greater than about 250 cP or equal to or greater than about 300 cP. For example, where the concentrated slurry comprises wollastonite, the concentrated slurry may have a viscosity ranging from about 200 cP to about 500 cP or from about 250 cP to about 450 cP or from about 300 cP to about 400 cP.

Where the concentrated slurry comprises diatomite, the concentrated slurry may have a viscosity equal to or less than about 2000 cP, for example equal to or less than about 1500 cP, for example equal to or less than about 1000 cP, for example equal to or less than about 800 cP. Where the concentrated slurry comprises diatomite, the concentrated slurry may have a viscosity equal to or less than about 700 cP, for example equal to or less than about 650 cP or equal to or less than about 600 cP or equal to or less than about 550 cP or equal to or less than about 500 cP or equal to or less than about 450 cP or equal to or less than about 400 cP. For example, where the concentrated slurry comprises diatomite, the concentrated slurry may have a viscosity equal to or greater than about 200 cP, for example equal to or greater than about 250 cP or equal to or greater than about 300 cP, for example equal to or greater than about 350 cP. For example, where the concentrated slurry comprises diatomite, the concentrated slurry may have a viscosity ranging from about 200 cP to about 2000 cP or from about 250 cP to about 1500 cP or from about 300 cP to about 1000 cP or from about 500 cP to about 1000 cP. For example, where the concentrated slurry comprises diatomite, the concentrated slurry may have a viscosity ranging from about 200 cP to about 700 cP or from about 250 cP to about 600 cP or from about 300 cP to about 500 cP.

The concentrated slurry may, for example, be pourable and pumpable.

Viscosity measurements are taken directly after slurry mixing at room temperature. Viscosity may be measured using a Brookfield DV2T LV viscometer, spindle 3 at 20 rpm or 50 rpm or 100 rpm, or spindle 5 at 20 rpm. The most suitable spindle will provide the most consistent readings and can be selected by a skilled person.

The concentrated slurry may, for example, comprise diatomite and have a solids content ranging from about 20 wt % to about 60 wt % and a viscosity ranging from about 100 cP to about 2000 cP. For example, the concentrated slurry may comprise diatomite and have a solids content ranging from about 20 wt % to about 60 wt % and a viscosity ranging from about 100 cP to about 1000 cP. For example, the concentrated slurry may comprise diatomite and have a solids content ranging from about 30 wt % to about 50 wt % and a viscosity ranging from about 500 cP to about 800 cP.

The concentrated slurry may, for example, comprise diatomite and have a solids content ranging from about 30 wt % to about 60 wt % and a viscosity ranging from about 100 cP to about 600 cP. For example, the concentrated slurry may comprise diatomite and have a solids content ranging from about 30 wt % to about 60 wt % and a viscosity ranging from about 100 cP to about 500 cP. For example, the concentrated slurry may comprise diatomite and have a solids content ranging from about 30 wt % to about 50 wt % and a viscosity ranging from about 100 cP to about 400 cP.

The concentrated slurry may, for example, comprise diatomite and from about 0.01% (w/v) to about 5% (w/v) of one or more dispersing agents and have a solids content ranging from about 20 wt % to about 60 wt % and a viscosity ranging from about 100 cP to about 2000 cP. For example, the concentrated slurry may comprise diatomite and from about 0.01% (w/v) to about 2% (w/v) of one or more dispersing agents and have a solids content ranging from about 20 wt % to about 50 wt % and a viscosity ranging from about 100 cP to about 1000 cP. For example, the concentrated slurry may comprise diatomite and from about 0.01% (w/v) to about 2% (w/v) of one or more dispersing agents and have a solids content ranging from about 20 wt % to about 50 wt % and a viscosity ranging from about 500 cP to about 800 cP.

The concentrated slurry may, for example, comprise diatomite and from about 0.01% (w/v) to about 5% (w/v) of one or more dispersing agents and have a solids content ranging from about 30 wt % to about 60 wt % and a viscosity ranging from about 100 cP to about 600 cP. For example, the concentrated slurry may comprise diatomite and from about 0.01% (w/v) to about 2% (w/v) of one or more dispersing agents and have a solids content ranging from about 35 wt % to about 60 wt % and a viscosity ranging from about 100 cP to about 500 cP. For example, the concentrated slurry may comprise diatomite and from about 0.01% (w/v) to about 2% (w/v) of one or more dispersing agents and have a solids content ranging from about 40 wt % to about 60 wt % and a viscosity ranging from about 100 cP to about 400 cP.

The concentrated slurry may, for example, comprise wollastonite and have a solids content ranging from about 40 wt % to about 80 wt % and a viscosity ranging from about 100 cP to about 600 cP. For example, the concentrated slurry may comprise wollastonite and have a solids content ranging from about 50 wt % to about 80 wt % and a viscosity ranging from about 100 cP to about 500 cP. For example, the concentrated slurry may comprise wollastonite and have a solids content ranging from about 50 wt % to about 80 wt % and a viscosity ranging from about 100 cP to about 400 cP.

The concentrated slurry may, for example, comprise wollastonite and from about 0.01% (w/v) to about 5% (w/v) of one or more dispersing agents and have a solids content ranging from about 40 wt % to about 80 wt % and a viscosity ranging from about 100 cP to about 600 cP. For example, the concentrated slurry may comprise wollastonite and from about 0.01% (w/v) to about 2% (w/v) of one or more dispersing agents and have a solids content ranging from about 50 wt % to about 80 wt % and a viscosity ranging from about 100 cP to about 500 cP. For example, the concentrated slurry may comprise wollastonite and from about 0.01% (w/v) to about 2% (w/v) of one or more dispersing agents and have a solids content ranging from about 60 wt % to about 80 wt % and a viscosity ranging from about 100 cP to about 400 cP.

The aqueous suspensions described herein as suitable for use as a fertilizer (aqueous suspensions comprising equal to or less than about 10% (w/v) of the mineral having a silica content equal to or greater than about 40 wt %) may, for example, be made from a powder or a concentrated slurry of the mineral having a silica content equal to or greater than about 40 wt %.

The aqueous suspensions described herein as suitable for use as a fertilizer may, for example, be made by mixing a powder or a concentrated slurry of the mineral having a silica content equal to or greater than about 40 wt % with an aqueous solvent such as, for example, water. Any suitable mixing equipment may be used.

The aqueous suspension for use as a fertilizer comprises a mineral having a silica content equal to or greater than about 40 wt %. For example, the aqueous suspension for use as a fertilizer may consist essentially of or consist of the mineral having a silica content equal to or greater than about 40 wt %. For example, the aqueous suspension for use as a fertilizer may consist essentially of or consist of the mineral having a silica content equal to or greater than about 40 wt % and optionally one or more of the further additives described herein. The term "consisting of" excludes any additional component not specifically recited. The term "consisting essentially of" limits the presence of further additives such that the total amount of additional components is equal to or less than about 10% (w/v) or equal to or less than about 5% (w/v) or equal to or less than about 2% (w/v) or equal to or less than about 1% (w/v).

The aqueous suspension suitable for use as a fertilizer comprises equal to or less than about 10% (w/v) of the mineral having a silica content equal to or greater than about 40 wt %. For example, the aqueous suspension for use as a fertilizer may comprise equal to or less than about 9.5% (w/v) or equal to or less than about 8% (w/v) or equal to or less than about 7.5% (w/v) or equal to or less than about 7% (w/v) or equal to or less than about 6.5% (w/v) or equal to or less than about 6% (w/v) or equal to or less than about 5.5% (w/v) or equal to or less than about 5% (w/v) equal to or less than about 4.5% (w/v) or equal to or less than about 4% (w/v) or equal to or less than about 3.5% (w/v) or equal to or less than about 3% (w/v) or equal to or less than about 2.5% (w/v) of the mineral having a silica content equal to or greater than about 40 wt %. The aqueous suspension for use as a fertilizer may, for example, comprise equal to or greater than about 0.01% (w/v) of the mineral having a silica content equal to or greater than about 40 wt %. For example, the aqueous suspension for use as a fertilizer may comprise equal to or greater than about 0.05% (w/v) or equal to or greater than about 0.1% (w/v) or equal to or greater than about 0.5% (w/v) or equal to or greater than about 1% (w/v) or equal to or greater than about 1.5% (w/v) or equal to or greater than about 2% (w/v) of the mineral having a silica content equal to or greater than about 40 wt %. For example, the aqueous suspension for use as a fertilizer may comprise from about 0.01% (w/v) to about 10% (w/v) of the mineral having a silica content equal to or greater than about 40 wt % or from about 0.05% (w/v) to about 8% (w/v) of the mineral having a silica content equal to or greater than about 40 wt % or from about 0.05% (w/v) to about 5% (w/v) of the mineral having a silica content equal to or greater than about 40 wt % or from about 0.5% (w/v) to about 4% (w/v) of the mineral having a silica content equal to or greater than about 40 wt %.

The aqueous suspension comprises an aqueous solvent. The aqueous solvent may, for example, be water.

The aqueous suspension for use as a fertilizer may optionally comprise one or more further additives. For example, the aqueous suspension for use as a fertilizer may further comprise one or more additional fertilizers. For example, the aqueous suspension for use as a fertilizer may comprise one or more dispersing agents, one or more wetting agents, one or more thickening agents, or any combination thereof.

Examples of dispersing agents suitable for use in the aqueous suspensions and concentrated slurries described herein may, for example, be made from monomers and/or co-monomers selected from the group consisting of acrylic acid, methacrylic acid, itaconic acid, crotonic acid, fumaric acid, maleic anhydride acid, isocrotonic acid, aconitic acid (cis or trans), mesaconic acid, sinapinic acid, undecylenic acid, angelic acid, canellic acid, hydroxyacrylic acid, acrolein, acrylamide, acrylonitrile, dimethylaminoethyl methacrylate, vinylpyrrolidone, vinylcaprolactam, ethylene, propylene, isobutylene, diisobutylene, vinyl acetate, styrene, [alpha]-methyl styrene, methyl vinyl ketone, the esters of acrylic and methacrylic acids and mixtures thereof. The dispersing agent may, for example, be polyacrylic acid and/or polymethacrylic acid and/or a salt thereof, for example sodium polyacrylate, polyacrylate natrium salt. Non-ionic dispersing agents such as polyethylene glycol and derivatives thereof are also suitable for use in the aqueous suspensions and concentrated slurries described herein. Carboxymethyl cellulose and hydroxyethyl cellulose are also examples of dispersing agents suitable for use in the aqueous suspensions and concentrated slurries described herein.

Some dispersing agents may also act as thickening agents for use in the aqueous suspensions and concentrated slurries described herein. For example, cellulose and cellulose derivatives such as carboxymethyl cellulose, hydroxyethyl cellulose and hydrophobically modified cellulose, and polymers of acrylic acid and methacrylic acid may also act as thickening agents. For example, polymers of acrylic acid and methacrylic acid modified with hydrophobic copolymers may be used as thickening agents.

Other mineral products, for example bentonite and/or attapulgite, may also act as thickening agents.

Other examples of thickeners include ethylene oxide and/or propylene oxide polymers or copolymers, polyethylene oxide (polyethylene glycol), ethylene oxide urethane, hydrophobically modified hydroxylated urethane, hydrophobically modified alkali swellable emulsion thickeners, diisobutylene-maleic anhydride copolymer, tannic acid, itaconic acid, glycerol monostearate, and natural thickeners such as lignin, sulfonated lignin, starch, hydrophobically modified starch, guar gum, gelatin, and xantham gum.

Examples of wetting agents for use in the aqueous suspensions and concentrated slurries described herein include organic silicones, for example non-ionic organic silicones, for example methylated silicone.

The one or more further additives may each be present in the aqueous suspension in an amount ranging from about 0.01% (w/v) to about 5% (w/v). For example, the one or more further additives may each be present in the aqueous suspension in an amount ranging from about 0.05% (w/v) to about 4% (w/v) or from about 0.1% (w/v) to about 3% (w/v) or from about 0.5% (w/v) to about 2% (w/v).

The total amount of further additives in the aqueous suspension may, for example, be equal to or less than about 10% (w/v). For example, the total amount of further additives in the aqueous suspension may be equal to or less than about 8% (w/v) or equal to or less than about 6% (w/v) or equal to or less than about 5% (w/v) or equal to or less than about 4% (w/v) or equal to or less than about 2% (w/v). For example, the total amount of further additives in the aqueous suspension may range from about 0.01% (w/v) to about 10% (w/v) or from about 0.1% (w/v) to about 5%.

The aqueous suspension suitable for use as a fertilizer may, for example, have a total solids content equal to or less than about 15 wt %. For example, the aqueous suspension suitable for use as a fertilizer may have a total solids content equal to or less than about 14 wt % or equal to or less than about 13 wt % or equal to or less than about 12 wt % or equal to or less than about 11 wt % or equal to or less than about 10 wt % or equal to or less than about 9 wt % or equal to or less than about 8 wt % or equal to or less than about 7 wt % or equal to or less than about 6 wt % or equal to or less than about 5 wt % or equal to or less than about 4 wt % or equal to or less than about 3 wt %. For example, the aqueous suspension suitable for use as a fertilizer may have a solids content equal to or greater than about 0.5 wt % or equal to or greater than about 1 wt % or equal to or greater than about 1.5 wt % or equal to or greater than about 2 wt %. For example, the aqueous suspension suitable for use as a fertilizer may have a total solids content ranging from about 0.5 wt % to about 15 wt % or from about 1 wt % to about 10 wt %.

The solid materials in the aqueous suspension may, for example, comprise equal to or greater than about 90 wt % of the mineral having a silica content equal to or greater than about 40 wt %. For example, the solids materials in the aqueous suspension may comprise equal to or greater than about 92 wt % or equal to or greater than about 94 wt % or equal to or greater than about 95 wt % or equal to or greater than about 96 wt % or equal to or greater than about 98 wt % of the mineral having a silica content equal to or greater than about 40 wt %. For example, the solids materials in the aqueous suspension may comprise from about 90 wt % to about 100 wt % or from about 92 wt % to about 99 wt % or from about 94 wt % to about 98 wt % of the mineral having a silica content equal to or greater than about 40 wt %.

The aqueous suspension suitable for use as a fertilizer and the concentrated slurry described herein comprises a mineral having a silica content equal to or greater than about 40 wt %. The following description of the mineral having a silica content equal to or greater than about 40 wt %, including the particle size properties, is equally applicable to the mineral when used in the aqueous suspension suitable for use as a fertilizer and the concentrated slurry.

The term "mineral" used herein refers to a naturally occurring, inorganic, solid substance which has a fixed structure and chemical composition. The term "silica" used herein refers to silicon dioxide, $SiO_2$.

The mineral having a silica content equal to or greater than about 40 wt % may, for example, have a silica content equal to or greater than about 45 wt % or equal to or greater than about 50 wt % or equal to or greater than about 55 wt % or equal to or greater than about 60 wt % or equal to or greater than about 65 wt % or equal to or greater than about 70 wt % or equal to or greater than about 75 wt % or equal to or greater than about 80 wt % or equal to or greater than about 85 wt % or equal to or greater than about 90 wt %. For example, the mineral having a silica content equal to or greater than about 40 wt % may have a silica content equal to or less than about 100 wt % or equal to or less than about 99 wt % or equal to or less than about 95 wt % or equal to or less than about 90 wt % or equal to or less than about 80 wt % or equal to or less than about 70 wt % or equal to or less than about 60 wt %. For example, the mineral having a silica content equal to or greater than about 40 wt % may have a silica content ranging from about 40 wt % to about 99 wt % or from about 40 wt % to about 95 wt % or from about 40 wt % to about 60 wt % or from about 60 wt % to about 99 wt %.

The silica content of a mineral may, for example, be determined by quantitative X-ray diffraction such as the Rietveld method.

The mineral having a silica content equal to or greater than about 40 wt % may, for example, be selected from diatomite, wollastonite, zeolite, kaolinite, bentonite, talc, chlorite, and combinations thereof. For example, the mineral having a silica content equal to or greater than about 40 wt % may be selected from diatomite, wollastonite, or a combination thereof.

Diatomite (also known as "diatomaceous earth" and "DE") is generally a sediment enriched in biogenic silica (i.e. silica produced or brought about by living organisms) in the form of siliceous skeletons (frustules) of diatoms. Diatoms are a diverse array of microscopic, single-celled, golden-brown algae generally of the class Bacillariophyceae that possess an ornate siliceous skeleton of varied and intricate structures comprising two valves that, in the living diatom, fit together much like a pill box.

Diatomite is generally made by processing very finely divided diatomite, including the diatomite ore. Natural diatomite is, in general, a sedimentary biogenic silica deposit comprising the fossilized skeletons or diatoms, one-celled algae-like plants that accumulate in marine or fresh water environments. Diatomite may be obtained from a saltwater source or a freshwater source and generally has a honeycomb silica structure which provides it with useful characteristics such as absorptive capacity, high surface area, chemical stability, and low bulk-density.

The DE may, for example, comprise one or more natural impurities such as clay and organic matters. Prior to its first use, the DE may undergo one or more chemical and/or physical modification processes which may, for example, remove one or more natural impurities. Physical modification processes include, for example, milling, drying and classifying. Chemical modification processes include, for example, silanization and calcination. Alternatively, prior to its first use, the DE may be unprocessed following mining or extraction.

Diatomite may comprise from about 65 wt % to about 98 wt % silica, for example from about 68 wt % to about 93 wt % silica or from about 70 wt % to about 90 wt % silica or from about 80 wt % to about 90 wt % silica. Natural diatomite may, for example, comprise about 90 wt % silica mixed with other substances. For example, crude diatomite may comprise about 90 wt % silica with one or more metal oxides, such as Al, Fe, Ca, and Mg oxides. For example, the DE may comprise about 1 wt % to about 5 wt %, for example from about 2 wt % to about 4 wt % alumina ($Al_2O_3$). For example, the DE may comprise from about 0.1 wt % to about 4 wt %, for example from about 0.5 wt % to about 2 wt % iron oxide.

Wollastonite is a calcium inosilicate mineral ($CaSiO_3$) that may contain small amounts of iron, magnesium, and/or manganese substituting for calcium. It generally forms when impure limestone or dolostone is subjected to high temperature and pressure, sometimes in the presence of silica-bearing fluids.

Wollastonite may, for example, comprise from about 40 wt % to about 60 wt % silica, for example from about 42 wt % to about 53 wt % silica or from about 45 wt % to about 52 wt % silica or from about 48 wt % to about 52 wt % silica.

The mineral having a silica content equal to or greater than about 40 wt % may, for example, have a Si availability equal to or greater than about 3% according to the acid extraction method. For example, the mineral having a silica content equal to or greater than about 40 wt % may have a Si availability equal to or greater than about 4% or equal to or greater than about 5% or equal to or greater than about 6% or equal to or greater than about 7% or equal to or greater than about 8% or equal to or greater than about 9% or equal to or greater than about 10% or equal to or greater than about 11% or equal to or greater than about 12% or equal to or greater than about 13% or equal to or greater than about 14% or equal to or greater than about 15% or equal to or greater than about 16%, according to the acid extraction method. The mineral having a silica content equal to or greater than about 40 wt % may, for example, have a Si availability equal to or less than about 50% or equal to or less than about 40% or equal to or less than about 30% or equal to or less than about 25% or equal to or less than about 20% or equal to or less than about 18% according to the acid extraction method. For example, the mineral having a silica content equal to or greater than about 40 wt % may have a Si availability ranging from about 3% to about 50% or from about 5% to about 40% or from about 6% to about 30% or from about 8% to about 25% or from about 10% to about 25% or from about 12% to about 20%, according to the acid extraction method.

The acid extraction method (NIAES, 1987) is disclosed in Masayoshi Koshino: Second Revision of The Methods of Analysis of Fertilizers (Details), page 144-146, Yokendo, Tokyo (1988), the contents of which are incorporated herein by reference. The method uses a 1 g test portion of the mineral having a silica content equal to or greater than about 40 wt %, which was agitated with 150 ml of HCl for at about 30° C. for 1 hour and then filtered once cooled to room temperature. Si availability was determined with the use of extra HCl, potassium fluoride solution, which transforms soluble silica to fluorosilicic acid ($H_2SiF_6$), which reacts with added potassium chloride to form a heavy precipitate of potassium silicofluoride ($K_2SiF_6$). This precipitate is titrated with alkali ($K_2SiF_6 + 4NaOH \rightarrow 2KF + 4NaF + H_4SiO_4$). The method is further described in the examples below.

The mineral having a silica content equal to or greater than about 40 wt % may, for example, have a Si availability equal to or greater than about 1% according to the alkaline extraction method. For example, the mineral having a silica content equal to or greater than about 40 wt % may have a Si availability equal to or greater than about 1.5% or equal to or greater than about 2% or equal to or greater than about 2.5% or equal to or greater than about 3% or equal to or greater than about 3.5% or equal to or greater than about 4% or equal to or greater than about 4.5% or equal to or greater than about 5% or equal to or greater than about 5.5% or equal to or greater than about 6%, according to the alkaline extraction method. The mineral having a silica content equal to or greater than about 40 wt % may, for example, have a Si availability equal to or less than about 20% or equal to or less than about 15% or equal to or less than about 10% or equal to or less than about 8%, according to the alkaline extraction method. For example, the mineral having a silica content equal to or greater than about 40 wt % may have a Si availability ranging from about 1% to about 20% or from about 2% to about 15% or from about 2% to about 10%, according to the alkaline extraction method.

The alkaline extraction method is described in Sebastian et al., Journal of AOAC International, Vol. 96, No. 2, 2013, which is incorporated herein by reference. A 0.2 g test portion of the mineral having a silica content equal to or greater than about 40 wt % was added to 100 ml of $Na_2CO_3$ solution (0.094 M) and 100 ml of $NH_4NO_3$ solution (0.20 M) and agitated for 1 hour. The samples remained undisturbed for 5 days before Si availability was determined colorimetrically using ammonium molubdate complex on a U2001 Hitachi Spectrophotometer at a wavelength of 660 nm. Tartaric acid was added to complex all the phosphorus in solution. The standard silicon curve was 0, 0.5 1.0 and 2.0 mg/l.

The mineral having a silica content equal to or greater than about 40 wt % may, for example, have a Si availability equal to or greater than about 0.001% according to the $CaCl_2$) extraction method. For example, the mineral having a silica content equal to or greater than about 40 wt % may have a Si availability equal to or greater than about 0.005% or equal to or greater than about 0.01% or equal to or greater than about 0.05% or equal to or greater than about 0.1%, according to the $CaCl_2$) extraction method. The mineral having a silica content equal to or greater than about 40 wt % may, for example, have a Si availability equal to or less than about 5% or equal to or less than about 2% or equal to or less than about 1% or equal to or less than about 0.5%, according to the $CaCl_2$) extraction method. For example, the mineral having a silica content equal to or greater than about 40 wt % may have a Si availability ranging from about 0.001% to about 5% or from about 0.005% to about 2% or from about 0.01% to about 1%, according to the alkaline extraction method.

The $CaCl_2$) extraction method uses 1 g of a test portion of the mineral having a silica content equal to or greater than about 40 wt %. The test portion is agitated with 100 ml of 0.01 M $CaCl_2$) solution for 2 hours (Korndorfer et al, 1999). The solution is then filtered and the Si content determined by ICP-OES atomic spectroscopy (Jones and Dreher, 1996).

The mineral having a silica content equal to or greater than about 40 wt % may, for example, have a $d_{50}$ equal to or less than about 50 μm. For example, the mineral may have a $d_{50}$ equal to or less than about 45 μm or equal to or less than about 40 μm or equal to or less than about 35 μm or equal to or less than about 30 μm or equal to or less than about 25 μm or equal to or less than about 20 μm or equal to or less than about 15 μm or equal to or less than about 10 μm or equal to or less than about 5 μm or equal to or less than about 3 μm. For example, the mineral may have a $d_{50}$ equal to or greater than about 0.1 μm or equal to or greater than about 0.5 μm or equal to or greater than about 1 μm or equal to or greater than about 2 μm or equal to or greater than about 3 μm or equal to or greater than about 4 μm or equal to or greater than about 5 μm. For example, the mineral may have a $d_{50}$ ranging from about 0.1 μm to about 50 μm or from about 0.1 μm to about 10 μm or from about 0.1 μm to about 5 μm or from about 0.1 μm to about 3 μm or from about 0.5 μm to about 10 μm or from about 0.5 μm to about 5 μm or from about 0.5 μm to about 3 μm or from about 4 μm to about 10 μm.

Where the mineral having a silica content equal to or greater than about 40 wt % is diatomite, the mineral may have a $d_{50}$ equal to or less than about 5 μm or equal to or less than about 4.5 μm or equal to or less than about 4 μm or equal to or less than about 3.5 μm or equal to or less than about 3 μm. Where the mineral having a silica content equal to or greater than about 40 wt % is diatomite, the mineral may have a $d_{50}$ equal to or greater than about 0.1 μm or equal to or greater than about 0.5 μm or equal to or greater than about 1 μm. For example, where the mineral having a silica content equal to or greater than about 40 wt % is diatomite, the mineral may have a $d_{50}$ ranging from about 0.1 μm to about 5 μm or from about 0.5 μm to about 4 μm or from about 0.5 μm to about 3 μm.

Where the mineral having a silica content equal to or greater than about 40 wt % is wollastonite, the mineral may have a $d_{50}$ equal to or less than about 10 μm or equal to or less than about 9.5 μm or equal to or less than about 9 μm or equal to or less than about 8.5 μm or equal to or less than about 8 μm. Where the mineral having a silica content equal to or greater than about 40 wt % is wollastonite, the mineral may have a $d_{50}$ equal to or greater than about 4 μm or equal to or greater than about 4.5 μm or equal to or greater than about 5 μm or equal to or greater than about 5.5 μm or equal to or greater than about 6 μm. For example, where the mineral having a silica content equal to or greater than about 40 wt % is wollastonite, the mineral may have a $d_{50}$ ranging from about 4 μm to about 10 μm or from about 5 μm to about 9 μm or from about 6 μm to about 8 μm.

The mineral having a silica content equal to or greater than about 40 wt % may, for example, have a $d_{90}$ equal to or less than about 80 μm. For example, the mineral having a silica content equal to or greater than about 40 wt % may have a $d_{90}$ equal to or less than about 75 μm or equal to or less than about 70 μm or equal to or less than about 65 μm or equal to or less than about 60 μm or equal to or less than about 55 μm or equal to or less than about 50 μm or equal to or less than about 45 μm or equal to or less than about 40 μm or equal to or less than about 35 μm. The mineral having a silica content equal to or greater than about 40 wt % may, for example, have a $d_{90}$ equal to or greater than about 5 μm or equal to or greater than about 10 μm or equal to or greater than about 15 μm or equal to or greater than about 20 μm. For example, the mineral having a silica content equal to or greater than about 40 wt % may have a $d_{90}$ ranging from about 5 μm to about 80 μm or from about 5 μm to about 70 μm or from about 5 μm to about 60 μm or from about 5 μm to about 50 μm or from about 5 μm to about 20 μm or from about 5 μm to about 10 μm.

Where the mineral having a silica content equal to or greater than about 40 wt % is diatomite, the mineral may have a $d_{90}$ equal to or less than about 15 μm. For example, where the mineral having a silica content equal to or greater than about 40 wt % is diatomite, the mineral may have a $d_{90}$ equal to or less than about 14 μm or equal to or less than about 13 μm or equal to or less than about 12 μm or equal to or less than about 11 μm or equal to or less than about 10 μm or equal to or less than about 9 μm or equal to or less than about 8 μm. Where the mineral having a silica content equal to or greater than about 40 wt % is diatomite, the mineral may have a $d_{90}$ equal to or greater than about 4 μm or equal to or greater than about 4.5 μm or equal to or greater than about 5 μm or equal to or greater than about 5.5 μm or equal to or greater than about 6 μm. For example, where the mineral having a silica content equal to or greater than about 40 wt % is diatomite, the mineral may have a $d_{90}$ ranging from about 4 μm to about 15 μm or from about 5 μm to about 10 μm.

Where the mineral having a silica content equal to or greater than about 40 wt % is wollastonite, the mineral may have a $d_{90}$ equal to or less than about 25 μm. For example, where the mineral having a silica content equal to or greater than about 40 wt % is wollastonite, the mineral may have a $d_{90}$ equal to or less than about 20 μm or equal to or less than about 15 μm or equal to or less than about 10 μm or equal to or less than about 8 μm. Where the mineral having a silica content equal to or greater than about 40 wt % is wollastonite, the mineral may have a $d_{90}$ equal to or greater than about 5 μm or equal to or greater than about 5.5 μm or equal to or greater than about 6 μm or equal to or greater than about 10 μm or equal to or greater than about 15 μm. Where the mineral having a silica content equal to or greater than about 40 wt % is wollastonite, the mineral may have a $d_{90}$ ranging from about 5 μm to about 25 μm or from about 5 μm to about 20 μm or from about 6 μm to about 15 μm or from about 6 μm to about 10 μm.

The mineral having a silica content equal to or greater than about 40 wt % may, for example, have a $d_{10}$ equal to or less than about 5 μm. For example, the mineral having a silica content equal to or greater than about 40 wt % may have a $d_{10}$ equal to or less than about 4 μm or equal to or less than about 3 μm or equal to or less than about 2 μm or equal to or less than about 1 μm or equal to or less than about 0.5 μm or equal to or less than about 0.2 μm. The mineral having a silica content equal to or greater than about 40 wt % may, for example, have a $d_{10}$ equal to or greater than about 0.01 μm or equal to or greater than about 0.05 μm or equal to or greater than about 0.1 μm. For example, the mineral having a silica content equal to or greater than about 40 wt % may have a $d_{10}$ ranging from about 0.01 μm to about 5 μm or from about 0.05 μm to about 2 μm or from about 0.1 μm to about 1 μm or from about 0.1 μm to about 0.5 μm.

Where the mineral having a silica content equal to or greater than about 40 wt % is diatomite, the mineral may have a $d_{10}$ equal to or less than about 2 μm. For example, where the mineral having a silica content equal to or greater than about 40 wt % is diatomite, the mineral may have a $d_{10}$ equal to or less than about 1.5 μm or equal to or less than about 1 μm. Where the mineral having a silica content equal to or greater than about 40 wt % is diatomite, the mineral may have a $d_{10}$ equal to or greater than about 0.05 μm or equal to or greater than about 0.1 μm or equal to or greater than about 0.5 μm. For example, where the mineral having a silica content equal to or greater than about 40 wt % is diatomite, the mineral may have a $d_{10}$ ranging from about 0.05 μm to about 2 μm or from about 0.1 μm to about 1 μm.

Where the mineral having a silica content equal to or greater than about 40 wt % is wollastonite, the mineral may have a $d_{10}$ equal to or less than about 3 μm. For example, where the mineral having a silica content equal to or greater than about 40 wt % is wollastonite, the mineral may have a $d_{10}$ equal to or less than 2.5 μm or equal to or less than about 2 μm. Where the mineral having a silica content equal to or greater than about 40 wt % is wollastonite, the mineral may have a $d_{10}$ equal to or greater than about 0.1 μm or equal to or greater than about 0.5 μm or equal to or greater than about 1 μm. Where the mineral having a silica content equal to or greater than about 40 wt % is wollastonite, the mineral may have a $d_{10}$ ranging from about 0.1 μm to about 3 μm or from about 0.5 μm to about 2.5 μm or from about 0.1 μm to about 2 μm.

The particle size properties referred to herein are measured in a well-known manner by sedimentation of the particulate material in a fully dispersed condition in an aqueous medium using a Sedigraph 5100 machine as supplied by Micromeritics Instruments Corporation, Norcross, Georgia, USA (www.micromeritics.com), referred to herein as a "Micromeritics Sedigraph 5100 unit", and based on application of Stokes' Law. Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. Particle size properties may be determined in accordance with ISO 13317-3, or any method equivalent thereto.

The mineral having a silica content equal to or greater than about 40 wt % that is used in the aqueous suspensions and concentrated slurries described herein may, for example, be diatomite and have a $d_{50}$ ranging from about 0.5 μm to about 2.5 μm. For example, the mineral having a silica content equal to or greater than about 40 wt % may be diatomite having a $d_{50}$ ranging from about 0.5 μm to about 2.5 μm and a $d_{90}$ equal to or less than about 10 μm. For example, the mineral having a silica content equal to or greater than about 40 wt % may be diatomite having a $d_{50}$ ranging from about 0.5 μm to about 2.5 μm and a $d_{90}$ equal to or less than about 10 μm and a $d_{10}$ equal to or less than about 1 μm. For example, the mineral having a silica content equal to or greater than about 40 wt % may be diatomite having a $d_{50}$ ranging from about 0.5 μm to about 2.5 μm and a $d_{90}$ ranging from about 4 μm to about 10 μm and a $d_{10}$ ranging from about 0.1 μm to about 0.5 μm.

The mineral having a silica content equal to or greater than about 40 wt % that is used in the aqueous suspensions and concentrated slurries described herein may, for example, be wollastonite and have a $d_{50}$ ranging from about 5 μm to about 10 μm. For example, the mineral having a silica content equal to or greater than about 40 wt % may be wollastonite having a $d_{50}$ ranging from about 5 μm to about 10 μm and a $d_{90}$ equal to or less than about 20 μm. For example, the mineral having a silica content equal to or greater than about 40 wt % may be wollastonite having a $d_{50}$ ranging from about 5 μm to about 10 μm and a $d_{90}$ equal to or less than about 20 μm and a $d_{10}$ equal to or less than about 5 μm. For example, the mineral having a silica content equal to or greater than about 40 wt % may be wollastonite having a $d_{50}$ ranging from about 5 μm to about 10 μm and a $d_{90}$ ranging from about 10 μm to about 15 μm and a $d_{10}$ ranging from about 0.5 μm to about 5 μm.

The aqueous suspensions described herein may be used as a plant fertilizer. For example, the aqueous suspensions described herein may be used in a method of fertilizing a plant which may, for example, comprise applying the aqueous suspension to a seed, plant or to growing substrate (e.g. soil) surrounding a seed or plant. The term "growing substrate" refers to any material from which a seed or plant may obtain nutrients to assist in its growth and development, for example soil, compost, minerals, hydroponics, or a combination thereof. The term "surrounding the seed or plant" refers to any area from which a seed or plant may obtain nutrients to assist in its growth and development. This may depend on the type and size of the seed or plant (e.g. length of its roots). The aqueous suspension may, for example, be applied to the growing substrate (e.g. soil) within about 1 m of the seed or plant or within about 0.5 m of the seed or plant or within about 0.3 m of the seed or plant or within about 0.2 m of the seed or plant.

The aqueous suspension may, for example, be applied to a seed, plant or to growing substrate (e.g. soil) around a seed or plant by any suitable means. The aqueous suspension may, for example, be applied to a seed, plant or to growing substrate (e.g. soil) around a seed or plant by spraying, for example by foliar spraying (spraying directly onto the leaves of the plant). The aqueous suspension may, for example, be applied to a seed, plant or to growing substrate (e.g. soil) around a seed or plant via an irrigation system (i.e. by fertigation).

Each treatment with the aqueous suspension may, for example, be applied such that the mineral having a silica content equal to or greater than about 40 wt % is applied in an amount ranging from about 1 kg/ha to about 40 kg/ha, for example from about 5 kg/ha to about 30 kg/ha or from about 10 kg/ha to about 25 kg/ha or from about 15 kg/ha to about 20 kg/ha.

One or more treatments with the aqueous suspension comprising the mineral having a silica content equal to or greater than about 40 wt % may be applied to the plant. For example, two, or three treatments with the aqueous suspension may be applied. For example, up to six or up to five or up to four treatments with the aqueous suspension may be applied.

The aqueous suspension may be used as a fertilizer for any suitable plant. The plant may, for example, be selected from cereals (e.g. wheat, barley, oats, rye, corn, maize, rice, sorghum, millet), legumes (e.g. kidney beans, lima beans, black beans, broad beans, peas, chickpeas, lentils, pulses), fruits, vegetables, and nuts. The plant may, for example, be wheat or lettuce.

The aqueous suspension may, for example, be applied to the seed or plant at any suitable stage in its growth and development.

For example, where the plant is wheat, the aqueous suspension may be applied at and/or after the stage of visible flag leaf blade (Zadock's stage GS47). For example, the aqueous suspension may be applied to wheat at and/or after Zadock's stage GS59 and/or at and/or after Zadock's stage GS75. For example, the aqueous suspension may be applied at all of Zadock's stage GS47, GS59, and GS75.

The use of the aqueous suspension as a fertilizer may, for example, increase the yield of the plant. For example, the yield of the plant may be increased by at least about 2% or at least about 3% or at least about 4% or at least about 5% or at least about 6% compared to the yield without the treatment with the aqueous suspension comprising the mineral having a silica content equal to or greater than about 40 wt %. For example, the yield may be increased by up to about 20% or up to about 10% or up to about 8% compared to the yield without the treatment with the aqueous suspension comprising the mineral having a silica content equal to or greater than about 40 wt %.

The use of the aqueous suspension as a fertilizer may, for example, increase the protein content of the plant. For example, the protein content of the plant may be increased by at least about 1% (i.e. 1 percentage point) or at least about 2% or at least about 3% or at least about 4% or at least about 5% or at least about 6% compared to the protein content without the treatment with the aqueous suspension comprising the mineral having a silica content equal to or greater than about 40 wt %. For example, the protein content may be increased by up to about 20% or up to about 10% or up to about 8% compared to the protein content without the treatment with the aqueous suspension comprising the mineral having a silica content equal to or greater than about 40 wt %.

The following numbered paragraphs define particular embodiments of the present invention:

1. Use of an aqueous suspension comprising a mineral having a silica content equal to or greater than about 40 wt % as a plant fertilizer, wherein the aqueous suspension comprises equal to or less than about 10% (w/v) of the mineral.

2. A method of fertilizing a plant, the method comprising:
   making an aqueous suspension comprising a mineral having a silica content equal to or greater than about 40 wt % from a powder or a concentrated slurry of the mineral having a silica content equal to or greater than about 40 wt %, and
   applying the aqueous suspension to the seed, plant or growing substrate, for example soil, surrounding a seed or plant, wherein the aqueous suspension comprises equal to or less than about 10% (w/v) of the mineral.

3. The use of paragraph 1 or method of paragraph 2, wherein the mineral has a silica content equal to or greater than about 45 wt % or equal to or greater than about 65 wt %.

4. The use or method of any preceding paragraph, wherein the mineral is diatomite, wollastonite, or a combination thereof.

5. The use or method of any preceding paragraph, wherein the mineral has a $d_{50}$ (sedigraph) equal to or greater than about 0.1 μm and/or equal to or less than about 50 μm.

6. The use or method of any preceding paragraph, wherein the mineral has a $d_{90}$ (sedigraph) of equal to or greater than about 5 μm and/or equal to or less than about 80 μm.

7. The use or method of any preceding paragraph, wherein the mineral has a $d_{10}$ (sedigraph) of equal to or greater than about 0.01 μm and/or equal to or less than about 5 μm.

8. The use or method of any preceding paragraph, wherein the aqueous suspension comprises equal to or greater than about 0.01% (w/v) of the mineral.

9. The use or method of any preceding paragraph, wherein the aqueous suspension comprises from about 0.5 wt % to about 5 wt % (w/v) of the mineral.

10. The use or method of any preceding paragraph, wherein the aqueous suspension has a total solids content equal to or less than about 15 wt % and/or equal to or greater than about 0.5 wt %.

11. The use or method of any preceding paragraph, wherein the aqueous suspension is applied to a seed or plant by foliar spraying.

12. The use or method of any preceding paragraph, wherein the aqueous suspension is applied to a seed or plant or growing substrate, for example soil, around a seed or plant by an irrigation system.

13. The use or method of any preceding paragraph, wherein the yield of the plant is increased and/or wherein the protein content of the plant is increased.

14. The use or method of any preceding paragraph, wherein the plant is wheat or lettuce.

15. The use or method of any preceding paragraph, wherein the aqueous suspension is made by diluting a concentrated slurry of any of paragraphs 16 to 40.

16. A concentrated slurry of a mineral having a silica content equal to or greater than about 40 wt %, wherein the concentrated slurry has a solids content equal to or greater than about 20 wt % or equal to or greater than about 30 wt % and a viscosity ranging from about 60 cP to about 2000 cP or from about 60 cP to about 700 cP.

17. The concentrated slurry of paragraph 16, wherein the concentrated slurry further comprises one or more dispersing agents, one or more thickeners, one or more wetting agents, or a combination thereof.

18. The concentrated slurry of paragraph 16 or 17, wherein the concentrated slurry comprises from about 0.5 wt % to about 2 wt % total dispersing agents.

19. The concentrated slurry of any of paragraphs 16 to 18, wherein the mineral having a silica content equal to or greater than about 40 wt % is wollastonite.

20. The concentrated slurry of paragraph 19, wherein the wollastonite has a $d_{50}$ (sedigraph) equal to or less than about 10 μm, for example equal to or less than about 9 μm, for example equal to or less than about 8 μm.

21. The concentrated slurry of paragraph 19 or 20, wherein the wollastonite has a $d_{50}$ (sedigraph) equal to or greater than about 4 μm, for example equal to or greater than about 5 μm, for example equal to or greater than about 6 μm.

22. The concentrated slurry of any of paragraphs 19 to 21, wherein the wollastonite has a $d_{90}$ (sedigraph) equal to or less than about 25 μm, for example equal to or less than about 20 μm, for example equal to or less than about 10 μm.

23. The concentrated slurry of any of paragraphs 19 to 22, wherein the wollastonite has a $d_{90}$ (sedigraph) equal to or greater than about 5 μm, for example equal to or greater than about 10 μm, for example equal to or greater than about 15 μm.

24. The concentrated slurry of any of paragraphs 19 to 23, wherein the wollastonite has a $d_{10}$ (sedigraph) equal to or less than about 3 μm, for example equal to or less than about 2 μm, for example equal to or less than about 1 μm.

25. The concentrated slurry of any of paragraphs 19 to 24, wherein the wollastonite has a $d_{10}$ (sedigraph) equal to or greater than about 0.1 μm, for example equal to or greater than about 0.5 μm, for example equal to or greater than about 1 μm.

26. The concentrated slurry of any of paragraphs 19 to 25, wherein the concentrated slurry has a solids content equal to or greater than about 50 wt %, for example equal to or greater than about 60 wt %, for example equal to or greater than about 70 wt %.

27. The concentrated slurry of any of paragraphs 19 to 26, wherein the concentrated slurry has a solids content equal to or less than about 85 wt % or equal to or less than about 80 wt % or equal to or less than about 75 wt %.

28. The concentrated slurry of any of paragraphs 19 to 27, wherein the concentrated slurry has a viscosity equal to or less than about 500 cP, for example equal to or less than about 400 cP.

29. The concentrated slurry of any of paragraphs 19 to 28, wherein the concentrated slurry has a viscosity equal to or greater than about 200 cP, for example equal to or greater than about 300 cP.

30. The concentrated slurry of any of paragraphs 16 to 18, wherein the mineral having a silica content equal to or greater than about 40 wt % is diatomite.

31. The concentrated slurry of paragraph 30, wherein the diatomite has a $d_{50}$ (sedigraph) equal to or less than about 5 μm, for example equal to or less than about 4 μm, for example equal to or less than about 3 μm.

32. The concentrated slurry of paragraph 30 or 31, wherein the diatomite has a $d_{50}$ (sedigraph) equal to or greater than about 0.5 μm, for example equal to or greater than about 1 μm.

33. The concentrated slurry of any of paragraphs 30 to 32, wherein the diatomite has a $d_{90}$ (sedigraph) equal to or less than about 15 μm, for example equal to or less than about 10 μm, for example equal to or less than about 8 μm.

34. The concentrated slurry of any of paragraphs 30 to 33, wherein the diatomite has a $d_{90}$ (sedigraph) equal to or greater than about 4 μm, for example equal to or greater than about 5 μm, for example equal to or greater than about 6 μm.

35. The concentrated slurry of any of paragraphs 30 to 34, wherein the diatomite has a $d_{10}$ (sedigraph) equal to or less than about 2 μm, for example equal to or less than about 1 μm, for example equal to or less than about 0.5 μm.

36. The concentrated slurry of any of paragraphs 30 to 35, wherein the diatomite has a $d_{10}$ (sedigraph) equal to or greater than about 0.05 μm, for example equal to or greater than about 0.1 μm, for example equal to or greater than about 0.2 μm.

37. The concentrated slurry of any of paragraphs 30 to 36, wherein the concentrated slurry has a solids content equal to or greater than about 30 wt %, for example equal to or greater than about 35 wt %.

38. The concentrated slurry of any of paragraphs 30 to 37, wherein the concentrated slurry has a solids content equal to or less than about 60 wt % or equal to or less than about 50 wt % or equal to or less than about 40 wt %.

39. The concentrated slurry of any of paragraphs 30 to 38, wherein the concentrated slurry has a viscosity equal to or less than about 700 cP, for example equal to or less than about 600 cP, for example equal to or less than about 500 cP.

40. The concentrated slurry of any of paragraphs 30 to 39, wherein the concentrated slurry has a viscosity equal to or greater than about 200 cP, for example equal to or greater than about 300 cP.

41. A method of making a concentrated slurry of any of paragraphs 16 to 40, the method comprising mixing a mineral having a silica content equal to or greater than about 40 wt % with water and optionally one or more dispersing agents, one or more thickeners, one or more wetting agents, or a combination thereof.

42. A method of making an aqueous suspension comprising equal to or less than about 10% (w/v) of a mineral having a silica content equal to or greater than about 40 wt %, the method comprising diluting a concentrated slurry of any of paragraphs 16 to 40.

EXAMPLES

Example 1

Materials and Methods

The effect of treatment with diatomite (DE) or wollastonite (W) on lettuce growth was determined.

The DE tested had a $d_{50}$ (sedigraph) of 1.28 μm and a $d_{50}$ (laser) of 11.7 μm.

The W tested had a $d_{50}$ (laser) of 12 μm.

The $d_{50}$ (laser) of the DE and W was measured by laser diffraction, for example using an instrument obtained from Malvern Panalytical or Microtrac.

The application of the samples was carried out in commercial plastic greenhouse lettuce cultivation in the region of Chrysoupoli (Kavala, North Greece). The application of each sample was performed 1 week after transplantation to 0.1 ha of hydroponic culture in 2 doses (20 kg/ha and 200 kg/ha). The samples were aqueous suspensions of either DE or W having a mineral content of 2% (w/v) and were applied by fertigation.

The lettuce plants were transplanted with 4 leaves at a distance of 20 cm within the line of lettuce plants and with 40 cm between the lines of lettuce plants. The experiments were repeated in 3 plots per treatment.

Visual evaluation for nutrient deficiency or phytotoxicity was achieved throughout the experimental period.

Sampling was performed 2 months after transplantation at the commercial harvest stage and total yield was assessed. Total yield was estimated as the average of 3 plots per treatment. Plant size was estimated based on a random sampling of 70 plants per treatment.

The total yield was expressed in tonnes per 0.1 ha. Individual plant weight was weighed to two decimal places, after removal of extraneous matter.

To determine the nutrient content of the leaves, plant tissue was washed, dried, ashed and then the trace elements and the macroelements were extracted and measured in Inductively Coupled Plasma Optical Emission Spectroscopy (ICP-OES). The total nitrogen content was measured in a Kjeldahl system.

Statistical analysis was performed with the ANOVA analysis using the SPSS statistical packet (SPSS v21.0, Chicago, USA). Different letters indicates statistical significant differences according to Duncan's multiple range test for significance level p=0.05.

Results

During the visual inspection of the lettuce cultivation under greenhouse conditions no evidence of nutrient deficiency or phytotoxicity was observed.

The difference in yield is shown in Table 1.

TABLE 1

| Plot | Control | DE (20 kg/ha) | W (20 kg/ha) | DE (200 kg/ha) | W (200 kg/ha) |
|------|---------|---------------|--------------|----------------|---------------|
| | | | Yield (Tonne/Ha) | | |
| 1 | 74.65 | 85.71 | 74.04 | 78.79 | 78.26 |
| 2 | 64.41 | 68.23 | 60.27 | 61.85 | 65.52 |
| 3 | 70.36 | 71.36 | 62.76 | 64.26 | 64.96 |
| Mean | 69.80a | 75.10a | 65.69a | 68.30 a | 69.58a |
| SD | 4.20 | 7.61 | 5.99 | 0.748 | 6.14 |

The data obtained from this experiment shows an increase of 5.3 tonnes per hectare in lettuces treated with 20 kg/ha of DE. This amounts to an increase of 7.6% in the total yield compared to the control despite the high density of the crop.

The mean size of each lettuce (n=70) at harvest after fertigation with DE and W in concentrations of 0 (control), 20, and 200 kg/ha is shown in Table 2.

TABLE 2

| Size | Control | DE (20 kg/ha) | W (20 kg/ha) | DE (200 kg/ha) | W (200 kg/ha) |
|------|---------|---------------|--------------|----------------|---------------|
| Mean | 519.1a | 567.4b | 488.3a | 507.6a | 525.9a |
| SD | 103.0 | 85.2 | 126.9 | 121.0 | 96.5 |

The size of the individual lettuces treated with 20 kg/ha of DE increased significantly, which increases the commercial value of the crop.

According to nutrient analysis, total nitrogen concentration was increased after DE treatment at a concentration of 200 kg/ha and 200 kg/ha. Phosphorous concentration was increased in response to DE treatment at 20 kg/ha and 200 kg/ha. Manganese concentration was increased in response to DE and W treatments at 20 kg/ha. Zinc concentration was increased in response to DE treatment at 200 kg/ha and in response to W treatment at 20 kg/ha and 200 kg/ha. Iron concentration was increased after W treatment at 20 kg/ha and 200 kg/ha. Copper concentration was increased after DE and W treatments at 200 kg/ha.

Example 2

The effect of treatment with diatomite (DE) or wollastonite (N) on wheat growth was determined. The same DE and W used in Example 1 were used in this Example.

The following treatments were tested:

Treatment 1: One foliar application of DE at the stage of visible flag leaf blade (Zadock's stage GS47)

Treatment 2: One foliar application of W at the stage of visible flag leaf blade (Zadock's stage GS47)

Treatment 3: Three foliar applications of DE (First application at the stage of visible flag leaf blade (Zadock's stage GS47), second application two weeks after the first application (Zadock's stage GS59), third application two weeks after the second application (Zadock's stage GS75))

Treatment 4: Three foliar applications of W (First application at the stage of visible flag leaf blade (Zadock's stage GS47), second application two weeks after the first application (Zadock's stage GS59), third application two weeks after the second application (Zadock's stage GS75))

Treatment 5: Control treatment (no foliar fertilizer applied)

The experiment was conducted in Thessaly, Greece. The experiment included four replications of each treatment at a complete randomized block design. It consisted of 20 plots with dimensions of 5 m×9 m.

The treatments were sprayed from 30 cm over the canopy with a field sprayer provided with flatfan nozzles operating at a pressure of 3 bar. Spraying was at a dose of 20 kg/ha diluted at 400 l/ha of water (5% (w/v)).

During harvesting, seed and shoot samples were taken from each plot. Moisture content was estimated by over drying seed samples to 105° C. for 24 hours. Hectolitre weight, protein content, gluten content, and grain colour were estimated using seed samples. The nutrient content was estimated using seed and shoot samples. Grain and shoot samples were analysed using a near infra-red (NIR) analyser (e.g. GRAINANALYSER Mill by Foss or Perten model 8800).

Average yield was estimated after normalising the results regarding the fresh weight of seeds at a common moisture basis of 10% for all the treatments.

Results

The grain yield and quality parameters obtained with each treatment are shown in Table 3.

TABLE 3

| Treatment | Crop Yield Moisture 10% (t/ha) | Grain moisture (%) | Grain hectolitre weight (kg/l) | Grain protein (%) | Gluten (%) | Colour Index |
|-----------|-------------------------------|--------------------|--------------------------------|-------------------|------------|--------------|
| 1 | 4.87 | 11.5 | 82.7 | 15.4 | 6.18 | 29.5 |
| 2 | 4.94 | 11.5 | 81.6 | 15.6 | 6.14 | 29.4 |
| 3 | 4.78 | 11.4 | 82.2 | 15.5 | 6.24 | 29.0 |

TABLE 3-continued

| Treatment | Crop Yield Moisture 10% (t/ha) | Grain moisture (%) | Grain hectolitre weight (kg/l) | Grain protein (%) | Gluten (%) | Colour Index |
|---|---|---|---|---|---|---|
| 4 | 4.86 | 11.5 | 83.1 | 15.7 | 6.34 | 29.1 |
| 5 | 4.73 | 11.5 | 82.8 | 14.7 | 6.03 | 28.4 |

Seed protein was up to 1% (1 percentage point) higher in the treated wheat compared to the control.

The average yield was 4.9 t/ha for treatment 1, 5.02 t/ha for treatment 2, 4.85 t/ha for treatment 3, 4.94 t/ha for treatment 4, and 4.81 t/ha for treatment 5.

Example 3

The diatomite mineral used in Examples 1 and 2 above was formulated into a concentrated slurry (DE 1). An additional diatomite mineral (DE 2) and wollastonite mineral (W) having were also formulated into concentrated slurries.

A 7 wt % suspension of each mineral in 0.2 wt % sodium hexametaphosphate solution was made. The particle size distribution of the minerals was determined by sedigraph. The results are shown in Table 4.

TABLE 4

| | $d_{50}$ (μm) | $d_{10}$ (μm) | $d_{90}$ (μm) |
|---|---|---|---|
| W | 6.71 | 1-1.5 | ~20 |
| DE 1 | 1.28 | <0.3 | ~5-6 |
| DE 2 | 1.96 | ~0.4 | ~8-10 |

Each mineral was then added incrementally to 200 mL of either room temperature tap water or a room temperature 1% solution of sodium polyacrylate with stirring. Samples were mixed for 5 minutes under high shear prior to viscosity testing or observation. The viscosity of slurries was visually assessed for degree of fluidity. The highest percentage solids achieved in each case was determined by visual inspection of the suspensions ability to flow freely and be stirred without significant resistance. The results are shown in Table 5.

TABLE 5

| | Highest % solids for fluid dispersion (water only) | Highest % solids for fluid dispersion (1% polyacrylate dispersant) |
|---|---|---|
| W | 50 | 71 |
| DE 1 | 22 | 30 |
| DE 2 | 44 | 50 |

The viscosity of each mineral was then analyzed in 100 mL of water with incrementally increasing solids content. Samples were mixed for 5 minutes under high shear prior to viscosity testing. Similarly, mineral was incrementally added to a sodium polyacrylate solution in water. Viscosity was measured using a Brookfield DV2T viscometer, spindle 3 at 100 rpm. The % solids to obtain a 500 cP and 800 cP are reported below in Table 6.

TABLE 6

| | Water | | Water + Dispersant | |
|---|---|---|---|---|
| | 500 cP | 800 cP | 500 cP | 800 cP |
| W | 57 | 60 | 61 | 63 |
| DE1 | 21.5 | 22.5 | 24 | 35 |
| DE2 | 43 | 44 | 47 | 49 |

The viscosity of various slurries of the W and DE1 used in the present Example was also measured using a Brookfield DV2T LV viscometer, spindle 3 at 20 rpm (wollastonite) or spindle 5 at 20 rpm (DE). Viscosity measurements are taken directly after slurry mixing at room temperature. The results are shown in Table 7.

TABLE 7

| | % Solids | % sodium polyacrylate dispersant | Viscosity (cP) |
|---|---|---|---|
| W | 50 | 0 | 520 |
| W | 70 | 1 | 335 |
| DE1 | 31 | 0 | 353 |

The foregoing broadly describes certain embodiments of the present invention without limitation. Variations and modifications as will be readily apparent to those skilled in the art are intended to be within the scope of the present invention as defined in and by the appended claims.

The invention claimed is:

1. A method of fertilizing a plant, the method comprising:
making an aqueous suspension comprising a mineral having a silica content equal to or greater than about 40 wt % from a powder or a concentrated slurry, and
applying the aqueous suspension to a seed, plant or growing substrate,
wherein:
the aqueous suspension comprises equal to or less than about 10% (w/v) of the mineral; and
the mineral is wollastonite having:
a $d_{50}$ (sedigraph) ranging from about 4 μm to about 10 μm;
a $d_{90}$ (sedigraph) ranging from about 5 μm to about 25 μm; and
a $d_{10}$ (sedigraph) ranging from about 0.1 μm to about 3 μm.

2. The method of claim 1, wherein the aqueous suspension comprises from about 0.5 wt % to about 5 wt % (w/v) of the mineral.

3. The method of claim 1, wherein the aqueous suspension has a total solids content between about 0.5 wt % and about 15 wt %.

4. The method of claim 1, wherein the aqueous suspension is made by diluting a concentrated slurry having a solids content equal to or greater than about 20 wt % and a viscosity ranging from about 60 cP to about 2000 cP.

5. A concentrated slurry of a mineral having a silica content equal to or greater than about 40 wt %, wherein;

the concentrated slurry has a solids content equal to or greater than about 20 wt % and a viscosity ranging from about 60 cP to about 2000 cP; and the mineral is wollastonite having:

a $d_{50}$ (sedigraph) ranging from about 4 $\mu$m to about 10 $\mu$m;

a $d_{90}$ (sedigraph) ranging from about 5 $\mu$m to about 25 $\mu$m; and a $d_{10}$ (sedigraph) ranging from about 0.1 $\mu$m to about 3 $\mu$m.

6. The concentrated slurry of claim 5, wherein the concentrated slurry further comprises one or more dispersing agents, one or more thickeners, one or more wetting agents, or a combination thereof.

7. The concentrated slurry of claim 5, wherein the concentrated slurry comprises from about 0.5 wt % to about 2 wt % total dispersing agents.

8. A method of making an aqueous suspension comprising diluting the concentrated slurry of claim 7, wherein the aqueous suspension comprises equal to or less than about 10% (w/v) of the mineral.

9. The method of claim 8 wherein the aqueous suspension comprises from about 0.5 wt % to about 5 wt % (w/v) of the mineral.

10. The method of claim 9 wherein the aqueous suspension has a total solids content between about 0.5 wt % and about 15 wt %.

11. The concentrated slurry of claim 9, wherein the concentrated slurry comprises from about 0.5 wt % to about 2 wt % total dispersing agents.

\* \* \* \* \*